(12) United States Patent
Kirchner et al.

(10) Patent No.: US 12,390,983 B2
(45) Date of Patent: Aug. 19, 2025

(54) APPARATUS AND METHOD FOR ADDITIVE MANUFACTURING OF HETEROGENEOUS STRUCTURE

(71) Applicant: Technische Universität Darmstadt, Darmstadt (DE)

(72) Inventors: Eckhard Kirchner, Erlangen (DE); Kay-Eric Steffan, Altrip (DE); Tim Martin Müller, Ludwigshafen-Oggersheim (DE)

(73) Assignee: Technische Universität Darmstadt, Darmstadt (DE)

( * ) Notice: Subject to any disclaimer, the term of this patent is extended or adjusted under 35 U.S.C. 154(b) by 197 days.

(21) Appl. No.: 18/027,083

(22) PCT Filed: Sep. 7, 2021

(86) PCT No.: PCT/EP2021/074554
§ 371 (c)(1),
(2) Date: Mar. 17, 2023

(87) PCT Pub. No.: WO2022/063562
PCT Pub. Date: Mar. 31, 2022

(65) Prior Publication Data
US 2023/0330919 A1    Oct. 19, 2023

(30) Foreign Application Priority Data
Sep. 25, 2020   (DE) ............ 10 2020 125 109.2

(51) Int. Cl.
*B29C 64/118*     (2017.01)
*B29C 64/188*     (2017.01)
(Continued)

(52) U.S. Cl.
CPC .......... *B29C 64/118* (2017.08); *B29C 64/188* (2017.08); *B29C 64/209* (2017.08);
(Continued)

(58) Field of Classification Search
CPC .... B29C 64/118; B29C 64/209; B29C 64/188
See application file for complete search history.

(56) References Cited

U.S. PATENT DOCUMENTS

2014/0268604 A1    9/2014   Wicker et al.
2016/0198576 A1    7/2016   Lewis et al.
(Continued)

FOREIGN PATENT DOCUMENTS

CN          105556008 B   * 12/2017  ........... B29C 70/523
CN          108602244 A   *  9/2018  ............. B33Y 10/00
(Continued)

OTHER PUBLICATIONS

Machine translation CN105556008B (Year: 2017).*
Machine translation CN108602244A (Year: 2018).*
Machine translation EP3640008 (Year: 2020).*

*Primary Examiner* — Abbas Rashid
*Assistant Examiner* — Wayne K. Swier
(74) *Attorney, Agent, or Firm* — Smartpat PLC (57) ABSTRACT

An apparatus for additively manufacturing a heterogeneous structure (50) using a plastic fiber (10) and an energy transfer material (20) is disclosed. Additive manufacturing is performed in a vertical direction (z) perpendicular to a horizontal plane (x-y). The apparatus comprises: a nozzle device (110) adapted to provide the plastic fiber (10) for additive manufacturing; a feeding device (120) adapted to move the energy transfer material (20) back and forth in a vertical direction (z); and moving device (130) adapted to independently move (or rotate) the feeding device (120) and the nozzle device (110) in the horizontal plane (x-y) to fabricate the heterogeneous structure (50) in the horizontal plane (x-y).

10 Claims, 4 Drawing Sheets

(51) Int. Cl.
*B29C 64/209* (2017.01)
*B29C 64/236* (2017.01)
*B29C 64/241* (2017.01)
*B33Y 10/00* (2015.01)
*B33Y 30/00* (2015.01)
*B33Y 40/00* (2020.01)

(52) U.S. Cl.
CPC .......... *B29C 64/236* (2017.08); *B29C 64/241* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2018/0015674 A1 | 1/2018 | Page | |
| 2018/0079131 A1 | 3/2018 | Espalin et al. | |
| 2019/0118252 A1* | 4/2019 | Bauer | B22F 3/1017 |
| 2019/0184633 A1* | 6/2019 | Sydow | B29C 64/118 |
| 2019/0263066 A1* | 8/2019 | Nystrom | B29C 64/118 |
| 2020/0016823 A1 | 1/2020 | Hymas et al. | |
| 2020/0061911 A1* | 2/2020 | Kettelarij | B29C 64/232 |
| 2020/0269503 A1* | 8/2020 | Born | B29C 64/245 |

FOREIGN PATENT DOCUMENTS

| | | | | |
|---|---|---|---|---|
| DE | 102016225837 A1 | 6/2018 | | |
| EP | 3640008 A1 * | 4/2020 | ............ | B33Y 30/00 |
| EP | 3656542 A1 | 5/2020 | | |
| WO | 2016149181 A1 | 9/2016 | | |

* cited by examiner

APPARATUS AND METHOD FOR ADDITIVE MANUFACTURING OF HETEROGENEOUS STRUCTURE

The present invention relates to an apparatus and method for additive manufacturing of a heterogeneous structure and, more particularly, to an additive manufacturing method (process) for integrating continuous materials.

BACKGROUND

In the "Fused Filament Fabrication" (FFF) additive manufacturing process, a plastic fiber is heated in a printing head to reduce viscosity, then extruded and applied to a substrate along a nozzle trajectory through a moving nozzle. The applied plastic fiber (plastic filament) cures on the substrate and bonds with previously applied plastic material to form a body to be manufactured.

In this manufacturing process, different plastic fibers with a different composition can be processed one after the other using a printing head, or the plastic fibers can be applied together with another material. This makes it possible for the plastic fiber to be combined with a metallic component for transmitting signals in order to form an electrically conductive structure or an integrated waveguide (e.g. for optical signals) in the body to be produced.

However, due to this process, it cannot be guaranteed that the metallic component meets certain certification requirements for industrial wires (cables) for power transmission. For example, the conductive structure may only be exposed to certain temperature influences or bending angles during production. This can hardly be ensured in conventional additive manufacturing systems.

Another disadvantage of the conventional processes is that the special fibers used for them are very high-grade, so that an economic benefit is hardly achievable. In addition, these processes do not allow the processing of a further, coherent component over several layer levels in one production step.

Therefore, there is a need for alternative additive manufacturing technologies where more freedom is possible to embed conductors or other structures in a plastic body via additive manufacturing.

BRIEF DESCRIPTION OF THE INVENTION

At least a part of these problems is solved by an apparatus and a method as disclosed herein. The dependent claims relate to advantageous further embodiments of the objects of the independent claims.

The present invention relates to an apparatus for additive manufacturing of a heterogeneous structure using a plastic fiber and a material for energy transfer. The additive manufacturing is performed in a vertical direction perpendicular to a horizontal plane. The apparatus comprises: a nozzle device, a feeding device, and a moving device. The nozzle device is adapted to provide the plastic fiber for additive manufacturing. The feeding device is adapted to move the material for energy transfer back and forth in the vertical direction, thereby feeding and removing the material. The moving device is configured to move (linearly or also rotate) the feeding device and/or the nozzle device independently of each other in the horizontal (optionally also vertical) plane in order to manufacture the heterogeneous structure in the horizontal plane.

It is understood that the vertical direction and the horizontal plane are to be understood here as a coordinate system and that the movements and the additive manufacturing do not necessarily or not only have to take place in these directions. For example, the horizontal plane (x-y plane) can be parallel to the manufacturing table on which the part is manufactured, and the vertical direction (z-direction) can define the build direction along which additive manufacturing can be performed. However, a rotating printing head and/or a rotating plate is also conceivable, so that manufacturing can also take place in a different direction, at least in the meantime. Nevertheless, this does not change the underlying coordinate system.

Additive manufacturing is based in particular on what is known as fused filament fabrication (FFF). In this additive manufacturing process, the nozzle device includes a heater for heating the plastic fiber so that it is heated to reduce viscosity, extruded via a movable nozzle and applied to a substrate. There, the plastic bonds with the previously applied plastic.

The material for energy transmission can be any flexible, extended structure and comprises in particular a conductor, cable (wire), etc. for conducting an electric current or a waveguide for conducting an optical signal. For this purpose, it is advantageous, for example, if the waveguide has a different refractive index than the plastic fiber used for additive manufacturing. The term "energy transmission" should be understood to include not only the provision of a supply voltage or a power source, but also signal or data transmission or functional integration.

For moving the material for energy transfer, the feeding device comprises, for example, a linear drive which is designed to enable a drive in the direction towards the heterogeneous structure, but also return of the material in order, if necessary, to guide the conductor in a direction away from the heterogeneous structure to be manufactured. In this way, it is possible to initially insert the exemplary conductor/guide and, if necessary, to detach it somewhat from the heterogeneous structure, for example, in order to also guide it vertically upwards. Likewise, it is possible in this way to insert the exemplary conductor/guide first and to continue working with the nozzle device at another point, so that the exemplary conductor is inserted further or is inserted finally into the heterogeneous structure only at a later time. Care is taken to ensure that the partially inserted conductor is not unintentionally torn out of the heterogeneous structure.

Optionally, the nozzle device and the feeding device are spaced apart in the horizontal plane. In addition, the moving device may be formed, for example, between the nozzle device and the feeding device. For example, the nozzle device and the feeding device may be movably attached to the moving device along a horizontal axis so as to allow maximum freedom with respect to movement. In particular, the feeding device and the nozzle device are not formed coaxially with respect to each other, so that the axial axes of the plastic fiber and the exemplary conductor do not coincide, but are laterally offset with respect to each other. The movement device can be formed centrally along the connecting axis between the nozzle device and the feeding device, for example.

Optionally, the movement device comprises at least one of the following drives to move nozzle device and/or the feeding device freely in the horizontal plane:
 a first drive (e.g., a linear drive or toothed rack) for moving in a first horizontal direction;
 a second drive (e.g. a linear drive or a toothed rack) for moving in a second horizontal direction;

a first rotary drive for rotating or circularly guiding the nozzle device about a first axis of rotation that is parallel to the vertical direction;

a second rotary drive for rotating or circularly guiding the feeding device about a second axis of rotation which is parallel to the vertical direction.

The first axis of rotation and the second axis of rotation are arranged differently from each other, for example. Likewise, the first axis of rotation can be formed offset from an axial direction of the plastic fiber. The same applies to the second rotary axis, which can also be formed laterally offset from the axial axis of the exemplary conductor. However, there can also be several rotary drives and/or several linear drives, so that the nozzle device and/or the feeding device can be rotated independently of one another about several or all spatial directions.

Optionally, the feeding device comprises a hold-down device, the hold-down device being configured to fix the energy transfer material in a vertical direction on the heterogeneous structure. For example, the hold-down device is formed laterally offset from the axial axis of the energy transfer material on the feeding device, so that an initially applied section of the energy transfer material is subsequently pressed onto the heterogeneous structure to be manufactured during movement by the hold-down device. In this way, it is possible, for example, for the energy transfer material to be pressed into a previously formed recess or groove and/or to be held there by means of the hold-down device.

Embodiments also relate to a method for additively manufacturing a heterogeneous structure comprising the following steps:

providing a plastic fiber, through a nozzle device, for additive manufacturing;

forming a heterogeneous structure by additive manufacturing using the plastic fiber of the heterogeneous structure;

feeding a material for energy transfer through a feeding device in a vertical direction; and moving the feeding device and the nozzle device by a moving device, wherein the moving device is designed to move the feeding device and the nozzle device independently of each other in the horizontal plane during the additive manufacturing.

Optionally, the movements of the feeding device and the nozzle device can also be dependent on each other. This allows the material to be moved as desired for energy transfer, both horizontally and vertically.

Optionally, the method comprises one or more of the following steps:

fabricating a first component portion with a recess to receive the energy transfer material;

inserting the material for energy transfer into the recess using a hold-down device;

closing the recess with the inserted material for energy transfer by an additively manufactured second component portion.

Embodiments solve the problems mentioned at the beginning in that the nozzle device and the feeding device are designed separately from each other and are separately movable, so that existing material (for example an industrial cable or a glass fiber) can be processed over several manufacturing layers for energy transfer without loss of certification in an additively manufactured component according to the so-called FFF process. Advantageously, flexible wires can be used as the material for energy transmission (e.g. copper wires), which can be embedded in the additively manufactured component in any way (horizontally as well as vertically). In this way, arbitrarily routed signal paths can be formed in the component. The design of the printing head and the printing process differ fundamentally from conventional processes.

BRIEF DESCRIPTION OF THE FIGURES

The embodiments of the present invention will be better understood with reference to the following detailed description and accompanying drawings of the various embodiments, which, however, should not be construed as limiting the disclosure to the specific embodiments, but are for explanation and understanding only.

DETAILED DESCRIPTION

Figure 1:
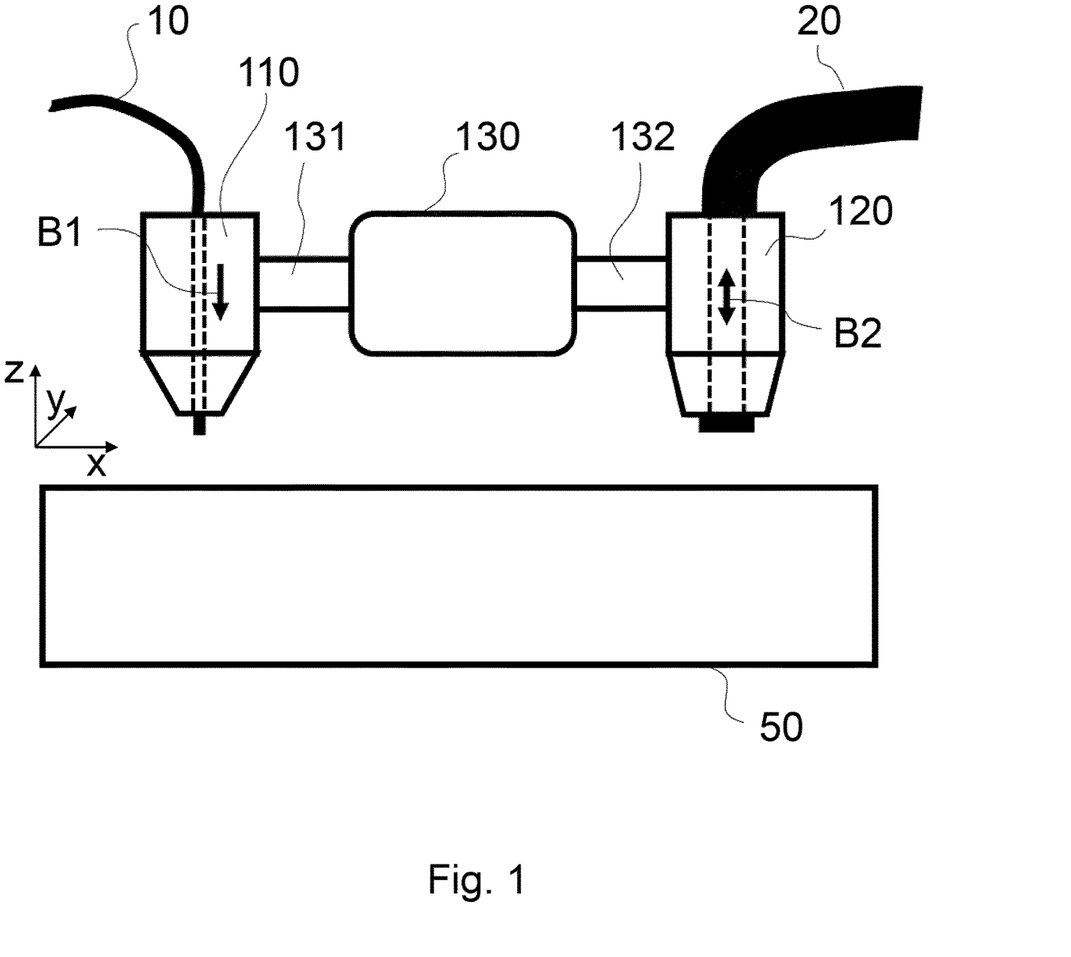
FIG. 1 shows a device for additive manufacturing according to an embodiment of the present invention.

FIG. 1 shows an apparatus for additive manufacturing of a heterogeneous structure 50 using a plastic fiber 10 and an energy transfer material 20 according to an embodiment. The additive manufacturing is performed in a vertical direction z perpendicular to a horizontal plane x-y. The apparatus comprises: nozzle device 110 adapted to provide the plastic fiber 10 for additive manufacturing; feeding device 120 adapted to move the energy transfer material 20 back and forth in a vertical direction z; and moving device 130 adapted to move the feeding device 120 and the nozzle device 110 independently in the horizontal plane x-y to manufacture the heterogeneous structure 50 in the horizontal plane x-y.

The material for energy transmission 20 can in particular be a cable or a conductor which is "pulled along" during the additive manufacturing of the heterogeneous structure 50 and can only be separated at the end in order to form an embedded conductor, for example. It is particularly advantageous if this is a flexible material (e.g. a copper line or a fiber optic cable) which is gradually embedded in the heterogeneous structure—without being separated—and is gradually enclosed by the latter. In this process, the insulation or the glass fiber cladding in particular can, but does not have to, be embedded as well, so as not to change the physical properties. It is understood that the energy transfer material 20 may extend not only horizontally, but also vertically, and may be laid in a straight line but also in a curved line. In particular, this material 20 is not a paste, as undesirable tearing may then occur (e.g., if it is to be moved upwardly so vertically relative to the heterogeneous structure).

The heterogeneous structure 50 to be manufactured extends in the horizontal plane (x-y plane) and grows layer by layer in the vertical z-direction during additive manufacturing. For this purpose, the nozzle device 110 provides the plastic fiber 10 along the feeding direction B1, whereby the nozzle device 110 heats the plastic fiber 10 and applies it to the substrate 50 in a viscous state. There, the heated plastic fiber fuses with previously applied material.

The material for energy transmission 20 is in particular a conductor for optical or electrical signals. The feeding device 120 is designed to move the conductor 20 along the feeding direction B2 in both directions (back and forth).

The movement device 130 is formed between the nozzle device 110 and the feeding device 120. Thus, the moving device 130 can hold the nozzle device 110 at a first axis arm 131 and the feeding device 120 at a second axis arm 132.

The axis suspension may be such that the nozzle device 110 is, for example, mounted on the movement device 130 so as to be rotatable as desired (about any spatial axis). In particular, the nozzle device 110 can be rotatably mounted about the vertical axis z, whereby the axis of rotation does not necessarily coincide with the axial direction of the plastic fiber 10, but can also be arbitrarily displaced with respect thereto. In this way, the feeding direction B1 for the plastic fiber 10 can point in any spatial direction.

Similarly, the suspension of the feeding device 120 from the second axis arm 132 may be such that the feeding device 120 is also rotatable about one or more axes of rotation in space (in particular, about directions parallel to the z-axis). In this way, the feeding direction B2 for the exemplary conduit 20 can point in any spatial direction.

In addition, at least one linear actuator may be provided (not shown) to move the nozzle device 110 and the feeding device 120 along the horizontal plane x-y.

Figure 2:
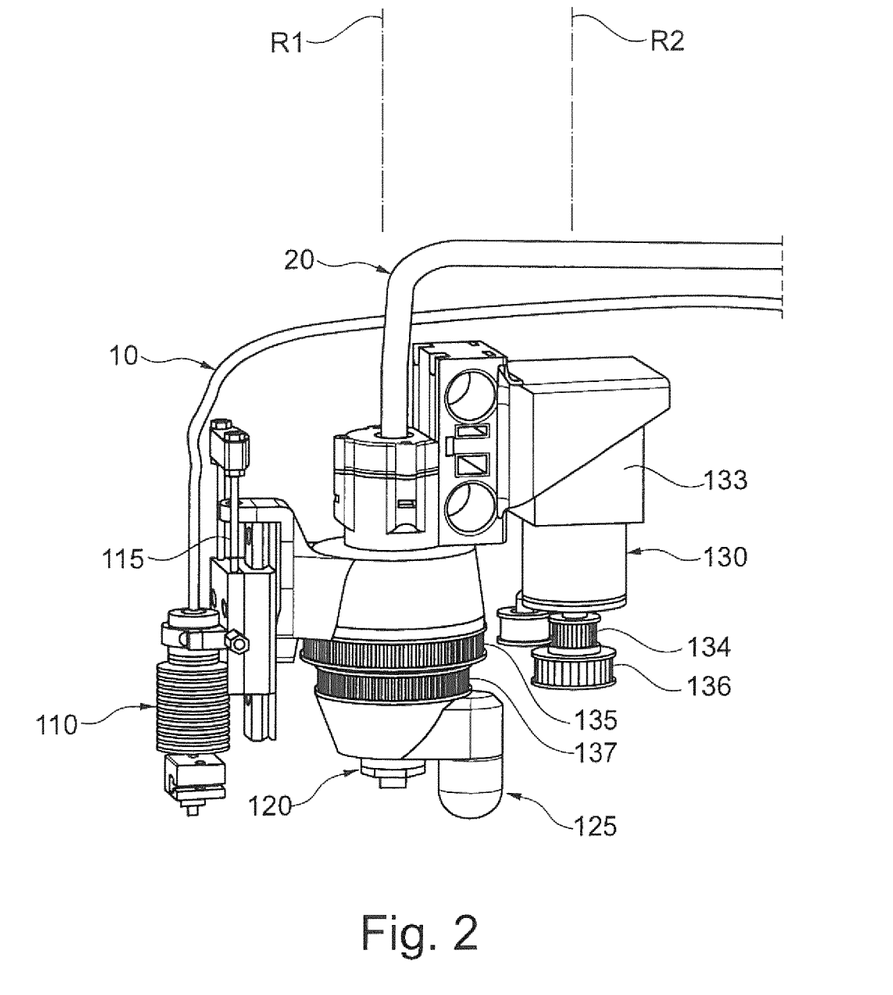
FIG. 2 shows an exemplary print head in which the device can be implemented according to embodiment examples.

FIG. 2 shows another embodiment of the device, which is formed as a print head. The print head again has the nozzle device 110 which heats, extrudes and applies the plastic fiber 10 to a surface. Also attached to the print head is the feeding device 120 (holder), which carries, for example, a cable (material for energy transfer 20) for energy transfer. Both the plastic fiber 10 and the cable 20 are driven and are forced out of the nozzle device 110 and the feeding device 120, respectively. In addition to the feeding device 120, a hold-down device 125 is further attached to the print head. By means of the hold-down device 125, the exemplary cable 20 can be fixed on the component while the print head traverses its predetermined print path (trajectory).

Two different materials can be processed with the nozzle device 110 and the feeding device 120. In the following, a distinction is made between the plastic fiber 10 and the cable 20. In principle, other materials can also be processed. The plastic fiber 10 is used to create the component geometry; the cable 20 for the desired signal/energy transmission. Because the cable 20 is highly movable, the possible approach points of the print head are not significantly restricted. Inexpensive standard materials, e.g. PLA, and a NYM cable 20 (designation according to DIN VDE 0292: 2007-05) can be used for the process.

The print head shown includes the feeding device 120 in the central region and, laterally offset therefrom, the nozzle device 110 with the heater to guide the plastic fiber 10 in the vertical direction onto the additive structure 50 to be manufactured (not shown in FIG. 2). Further, in this embodiment, the feeding device 120 has an optional linear actuator 115 to linearly move the nozzle device 110 upward or downward in the vertical direction. It is adjustable in height.

The embodiment example of FIG. 2 comprises a plurality of rotary drives which are driven, for example, via at least one electric motor 133 in the movement device 130. For this purpose, a first toothed element 134 is formed which can drive a second toothed element 135, for example via a toothed belt, in order to thereby rotate the nozzle device 110 about an axis of rotation R1 which extends through the conductor 20. In addition, a third toothed element 136 may be driven by the electric motor 133, and again a toothed belt may drive a fourth toothed element 137 to rotate, for example, the hold-down device 125 about the axis of rotation R1. It is also possible for the feeding device 120 to be rotatable about an axis of rotation R2 that passes through the electric motor 133. The toothed belts are not shown in the embodiment. In this way, it is possible for the nozzle device 110 and the feeding device 120 to be movable as desired on the substrate. In addition, another line drive can again be used to allow horizontal displacement of the entire device.

Figure 3:
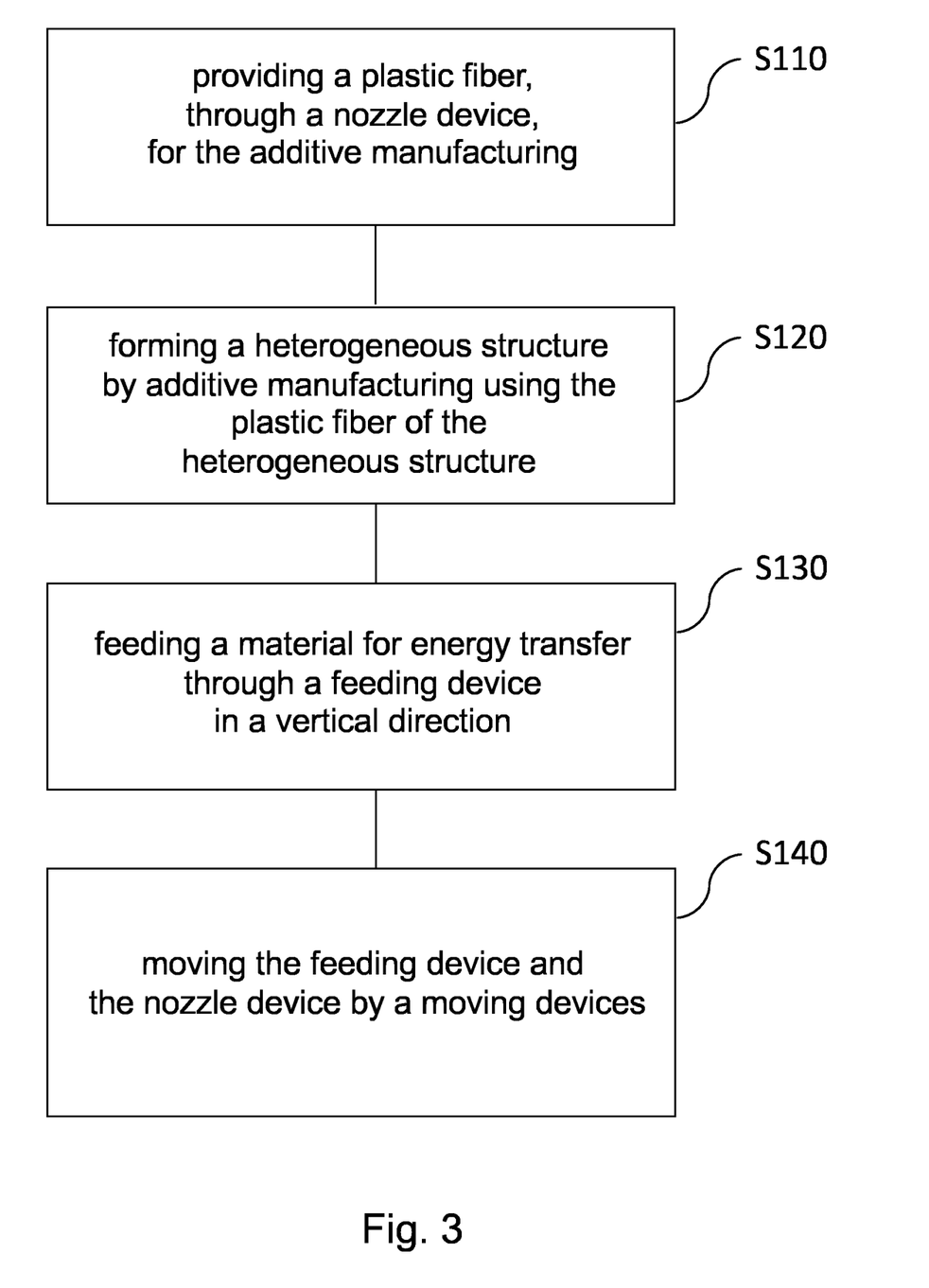
FIG. 3 shows a schematic flow diagram for an additive manufacturing process according to embodiments.

FIG. 3 schematically shows a flow diagram for an additive manufacturing method according to embodiments. The method comprises:

providing S110 of a plastic fiber 10, by a nozzle device 110, for additive manufacturing;

forming S120 of a heterogeneous structure 50 by additive manufacturing using the plastic fiber 10 of the heterogeneous structure;

feeding S130 a material for energy transfer 20 through a feeding device 120 in a vertical direction z; and moving S140 the feeding device 120 and/or the nozzle device 110 by a moving device 130, wherein the moving device 130 is configured to move the feeding device 120 and the nozzle device 110 independently of each other in the horizontal plane x-y during additive manufacturing.

Figure 4:
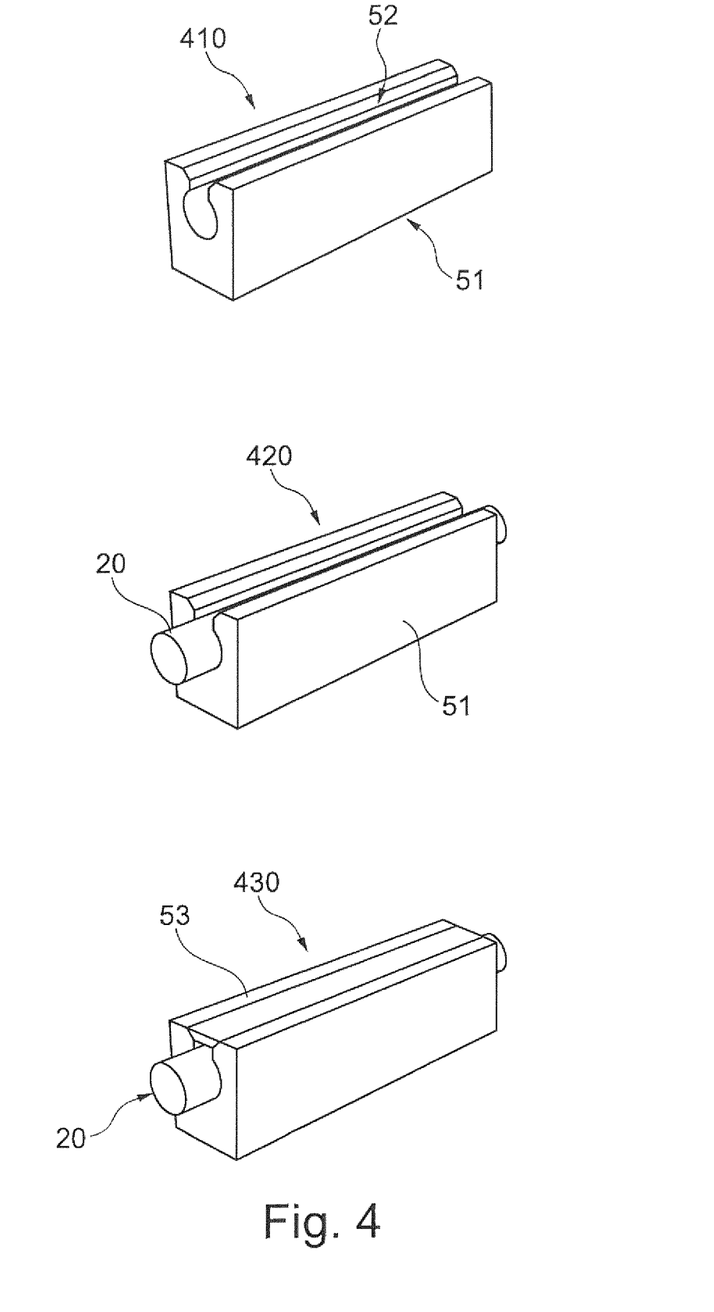
FIG. 4 illustrates the production of a heterogeneous component that can be produced with the device according to embodiment examples.

FIG. 4 shows an example of a heterogeneous structure 50 manufactured according to the method. In this embodiment, in a first method step 410, a first component portion 51 is manufactured with a recess or groove 52 for receiving the material for energy transfer 20. In a next manufacturing step 420, the energy transfer material 20 is inserted or pressed into the recess 52 using a hold-down 125. Then, in the last method step 430, the recess 52 is closed with the inserted material for energy transfer 20 by means of an additively manufactured second component portion 53. This second component portion 53 can be produced in particular in layers by additive manufacturing on the first component portion 51, i.e. is not placed as a whole.

It is understood that the method steps can be decoupled in terms of time and location. All method steps or a part thereof can be carried out simultaneously at different locations on the component. The method steps can also be repeated or carried out in the sequence described or in a different sequence, as long as the desired result of a heterogeneous structure 50 can be achieved.

In detail, the manufacturing method according to embodiment examples can be summarized as follows:

The component geometry to be printed is converted into a layer-by-layer structure for the FFF process with the aid of software. The layers are subsequently implemented by the plastic fiber 10. In addition, the required certification criteria for the cable routing within the component and other design principles can be defined. For process control, the software calculates trajectories for the print head and its movable components.

The manufacturing method begins with the production of the component (the heterogeneous structure 50). For this purpose, individual layers of plastic fiber 10 are applied to a surface in a manufacturing direction according to the "fused filament fabrication" method. The plastic fiber 10 is heated in the nozzle (the nozzle device 110) to reduce viscosity, extruded by further advancing the plastic fiber 10 through the nozzle 110, and applied to a surface. The still soft plastic fiber 10 subsequently hardens on the surface. A drive continuously presses new plastic fibers 10 into the nozzle 110 so that they can be continuously applied.

When the previously manufactured base reaches an entry or exit point of the exemplary cable 20 from the component 50 in the direction of manufacture, a receiving device (recess 52), also made of the plastic fiber 10, is printed in the component. The receiving device 52 can be realized, for example, in the form of a channel from the entry point to the exit point of the cable (see FIG. 4), in which the cable 20 can be inserted and fixed. The receiving device 52 can have any shape and trajectory according to the requirements, in particular it is conceivable that the receiving device 52 runs through several layers. Once the receiving device 52 is completed, the cable 20 is pressed out of the cable holder (feeding device 120) at an insertion point (entry or exit point) and is pressed into the receiving device 52 by the holding-down device 125. Ideally, the cable 20 is held by the receiving device 52 itself; otherwise, the hold-down device 125 may permanently lock the cable 20 in place or the receiving device 52 may be directly closed by the plastic fiber 10. As the manufacturing method progresses, the cable 20 may be continuously pressed into the receiving device 52 by the hold-down 125. However, this is not mandatory. The cable 20 also needs to be pressed in only in certain partial steps and hang freely in other method phases, for example.

In order to ensure that the travel movements of the print head are not restricted by the fastening of the cable 20 to the receiving device 52, the cable 20 can be balanced without tension during each travel movement of the print head by moving it out of and into the cable holder 120. This ensures that the cable 20 is not inadvertently torn or kinked from the receiving device 52. Consequently, it is possible that information about an absolute position of the print head may be lost. A calibration step that may be required as a result of this interrupts production. Furthermore, the ability of the nozzle 110 to move around the cable holder 120 ensures that the printing method can continue around the cable 20. Individual plastic fiber layers are thus applied over the cable 20 or around the cable 20 (e.g., in a height buildup) without heating the cable 20 outside of defined temperature limits. The cable 20 is gradually enclosed by the remainder of the component 50 until the cable 20 reaches the other end point and the component 50 is completed. During the manufacturing method, the cable 20 is separated after reaching the end point.

Embodiments provide the following advantages:

The manufacturing of a signal-transmitting component 50 becomes possible with less effort, and a shortening of the manufacturing method of such a component 50 is achievable. Furthermore, a lean manufacturing method of such a component 50, for example in lightweight construction, and with low material costs becomes possible. Even in late development phases, it is possible to make geometry changes that do not cause high development costs. Automation is possible. Location-independent positioning of the material in the components 50 opens up a new potential for additive manufacturing.

Therefore, embodiments may be used for industrial applications of cables for power transmission (electrical, optical, etc.), with the manufactured heterogeneous structures satisfying 50 specific environmental conditions (temperature, minimum bend angle, etc.) as they arise during assembly and application of the cables.

Therefore, embodiments can be used in particular in mechanical engineering, where it is often the case that required geometries are to be manufactured additively, but at the same time should also offer the possibility of providing energy transfer. In this context, the fused filament fabrication method in particular is frequently used. A significant advantage of embodiments is the design of the manufacturing method so that cables can be used in a certified manner under defined environmental conditions.

The features of the invention disclosed in the description, the claims and the figures may be essential to the realization of the invention either individually or in any combination.

LIST OF REFERENCE SIGNS 10 plastic fiber
20 material for energy transfer (e.g. a conductor)
50 heterogeneous structure to be manufactured
51, 53 component portions
52 recess
110 nozzle device
115 linear drive (actuator)
120 feeding device
125 hold-down device
130 movement device
131, 132 axle suspensions
133 one or more motors
134, 135, . . . toothed elements (gears, sprockets, etc.)
410, 420, 430 steps in embedding a wire (cable)
R1, R2 rotary axes for the rotary drives
B1, B2 directions of movement
z vertical axis (along which the additively manufactured component grows)
x-y horizontal plane

The invention claimed is:

1. An apparatus for additively manufacturing a heterogeneous structure using a plastic fiber and an energy transfer material, wherein the additive manufacturing is performed in a vertical direction perpendicular to a horizontal plane, the apparatus comprising:
   a nozzle device configured to provide the plastic fiber for additive manufacturing;
   a feeding device adapted to move the energy transfer material back and forth in a vertical direction; and
   a moving device adapted to move the feeding device and the nozzle device independently in the horizontal plane to fabricate the heterogeneous structure in the horizontal plane.

2. The apparatus of claim 1, wherein the nozzle device and the feeding device are spaced apart in the horizontal plane.

3. The apparatus according to claim 1, wherein the moving device comprises at least one of the following drives to move nozzle device and/or the feeding device freely in the horizontal plane:
   a first drive for moving in a first horizontal direction;
   a second drive for moving in a second horizontal direction;
   a first rotary drive for rotating or for circularly guiding the nozzle device about a first axis of rotation which is parallel to the vertical direction;
   a second rotary drive for rotating or circularly guiding the feeding device about a second axis of rotation that is parallel to the vertical direction.

4. The apparatus according to claim 1, wherein the feeding device comprises a hold-down device, wherein the hold-down device is configured to fix the energy transfer material in a vertical direction on the heterogeneous structure.

5. The apparatus according to claim 4, wherein the moving device comprises a motor device adapted to move, via at least one toothed belt, the nozzle device around the feeding device or to move the hold-down device around the feeding device.

6. A method for additively manufacturing a heterogeneous structure comprising the following steps:

providing a plastic fiber, by a nozzle device, for additive manufacturing;

forming a heterogeneous structure by additive manufacturing using the plastic fiber of the heterogeneous structure;

feeding a material for energy transfer by a feeding device in a vertical direction back and forth; and moving the feeding device and the nozzle device by a moving device, wherein the moving device is adapted to move the feeding device and the nozzle device independently of each other in the horizontal plane during additive manufacturing.

7. The method of claim 6, wherein the additive manufacturing comprises the following phases:

fabricating a first component portion having a recess for receiving the energy transfer material;

placing the energy transfer material into the recess using a hold-down device; and closing the recess with the energy transfer material by an additively manufactured second component portion.

8. The apparatus according to claim 1, wherein the moving device comprises a first rotary drive for rotating or for circularly guiding the nozzle device about a first axis of rotation which is parallel to the vertical direction.

9. The apparatus according to claim 8, wherein the moving device comprises a second rotary drive for rotating or circularly guiding the feeding device about a second axis of rotation that is parallel to the vertical direction.

10. The apparatus according to claim 1, further comprising a print head comprising the nozzle device and the feeding device, wherein the feeding device comprises a linear actuator to move the nozzle device upward and downward.

\* \* \* \* \*